(12) United States Patent
Orita

(10) Patent No.: US 9,676,292 B2
(45) Date of Patent: Jun. 13, 2017

(54) HYBRID VEHICLE CONTROL DEVICE

(71) Applicant: Nissan Motor Co., Ltd., Yokohama-shi, Kanagawa (JP)

(72) Inventor: Shuichi Orita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/917,157

(22) PCT Filed: Oct. 10, 2013

(86) PCT No.: PCT/JP2013/077553
§ 371 (c)(1),
(2) Date: Mar. 7, 2016

(87) PCT Pub. No.: WO2015/052807
PCT Pub. Date: Apr. 16, 2015

(65) Prior Publication Data
US 2016/0214503 A1 Jul. 28, 2016

(51) Int. Cl.
*B60L 11/00* (2006.01)
*B60L 15/00* (2006.01)
(Continued)

(52) U.S. Cl.
CPC .............. *B60L 15/007* (2013.01); *B60K 6/48* (2013.01); *B60K 6/543* (2013.01); *B60L 11/08* (2013.01);
(Continued)

(58) Field of Classification Search
CPC B60L 15/007; B60L 11/1868; B60L 15/2045; B60L 11/08; B60L 11/1803; B60L 11/1877; B60K 6/48; B60K 6/543; B60W 10/26; B60W 20/00; B60W 10/06; B60W 10/08; B60W 30/18054; B60W 30/192; B60W 2510/244; B60W 20/15; Y02T 10/6221; Y02T 10/7005; Y02T 10/7066; Y02T 10/7283; Y02T 10/645;
(Continued)

(56) References Cited

U.S. PATENT DOCUMENTS

2004/0099234 A1 5/2004 Tamai et al.
2007/0113814 A1 5/2007 Tamai et al.
(Continued)

FOREIGN PATENT DOCUMENTS

CN 102815294 A 12/2012
JP 2000-253507 A 9/2000
(Continued)

*Primary Examiner* — Mary Cheung
(74) *Attorney, Agent, or Firm* — Global IP Counselors, LLP

(57) ABSTRACT

A hybrid vehicle control device is provided for controlling a drive system in a hybrid vehicle. The hybrid vehicle control device is provided with a hybrid control module that controls an operation start timing of a DC/DC converter at vehicle startup. When an ignition switch is pressed, after connecting a high power relay that is interposed between the motor/generator and the high power battery, the hybrid control module starts operation of the DC/DC converter upon determining that the outputtable electric power by the high power battery is a prescribed value or greater.

2 Claims, 5 Drawing Sheets

(51) Int. Cl.

| | | |
|---|---|---|
| *B60K 6/48* | (2007.10) | |
| *B60K 6/543* | (2007.10) | |
| *B60W 10/26* | (2006.01) | |
| *B60L 11/18* | (2006.01) | |
| *B60L 15/20* | (2006.01) | |
| *B60L 11/08* | (2006.01) | |
| *B60W 20/00* | (2016.01) | |
| *B60W 10/06* | (2006.01) | |
| *B60W 10/08* | (2006.01) | |
| *B60W 30/18* | (2012.01) | |
| *B60W 30/192* | (2012.01) | |
| *F02N 11/00* | (2006.01) | |
| *B60W 20/15* | (2016.01) | |

(52) U.S. Cl.
CPC ....... *B60L 11/1803* (2013.01); *B60L 11/1868* (2013.01); *B60L 11/1877* (2013.01); *B60L 15/2045* (2013.01); *B60W 10/06* (2013.01); *B60W 10/08* (2013.01); *B60W 10/26* (2013.01); *B60W 20/00* (2013.01); *B60W 20/15* (2016.01); *B60W 30/18054* (2013.01); *B60W 30/192* (2013.01); *F02N 11/006* (2013.01); *B60W 2510/244* (2013.01); *Y02T 10/6221* (2013.01); *Y02T 10/645* (2013.01); *Y02T 10/7005* (2013.01); *Y02T 10/7066* (2013.01); *Y02T 10/72* (2013.01); *Y02T 10/7283* (2013.01); *Y10S 903/904* (2013.01); *Y10S 903/951* (2013.01)

(58) Field of Classification Search
CPC .. Y02T 10/72; Y02S 903/904; Y02S 903/951; F02N 11/006
See application file for complete search history.

(56) References Cited

U.S. PATENT DOCUMENTS

| | | |
|---|---|---|
| 2007/0205031 A1 | 9/2007 | Ogata |
| 2014/0210216 A1* | 7/2014 | Konishi ............... B60K 6/48 290/38 R |

FOREIGN PATENT DOCUMENTS

| | | |
|---|---|---|
| JP | 2008-110700 A | 5/2008 |
| JP | 2009-120045 A | 6/2009 |
| JP | 2013-90486 A | 5/2013 |
| JP | 2013-95246 A | 5/2013 |
| KR | 10-0858200 B1 | 9/2008 |

* cited by examiner

HYBRID VEHICLE CONTROL DEVICE

CROSS-REFERENCE TO RELATED APPLICATIONS

This application is a U.S. National stage application of International Application No. PCT/JP2013/077553, filed Oct. 10, 2013.

BACKGROUND

Field of the Invention

The present invention relates to a hybrid vehicle control device, comprises a starter motor, an engine, a power motor, and an auxiliary battery that is charged by a high power battery via a DC/DC converter.

Background Information

Conventionally, a hybrid vehicle control device comprises a starter motor, an engine, a power motor, and an auxiliary battery that is charged by a high power battery via a DC/DC converter is known (for example, refer to Patent Document 1: Japanese Laid-Open Patent Application No. 2000-253507).

SUMMARY

However, in a conventional device, the DC/DC converter is configured to start operating at a point in time in which pre-startup preparation, such as securing the hydraulic pressure and engaging the clutch, is completed (Ready ON). Consequently, there is the problem that, if the auxiliary load is high before the completion of the pre-startup preparation, there is the possibility that the auxiliary battery voltage falls below the operating voltage of each controller preventing startup, or, the possibility that even if startup is possible, the auxiliary battery is damaged and that the durability thereof will be decreased.

In view of the problem described above, an object of the present invention is to provide a hybrid vehicle control device that is able to ensure vehicle startup and the durability of an auxiliary battery, and which reduces the size of the auxiliary battery.

In order to achieve the object above, the present invention comprises, in a drive system, a starter motor, an engine, a clutch, and a power motor.
Additionally, a high power battery, which is a power source of the power motor, an auxiliary battery which is a power source of the starter motor, and a DC/DC converter that is disposed in an intermediate position connecting the high power battery and the auxiliary battery. The auxiliary battery is charged by the high power battery via the DC/DC converter. This hybrid vehicle comprises a DC/DC operation timing control means that controls the operation start timing of the DC/DC converter at vehicle startup. When a startup switch is pressed, the DC/DC operation timing control means connects a heavy current relay interposed between the power motor and the high power battery, and thereafter starts the operation of the DC/DC converter, if the outputtable electric power by the high power battery is a predetermined value or greater.

Therefore, when the startup switch is pressed, after connecting a heavy current relay interposed between a power motor and a high power battery, an operation of the DC/DC converter is started when the outputtable electric power by the high power battery is a predetermined value or greater. That is, if the outputtable electric power by the high power battery is a predetermined value or greater after connecting the heavy current relay, the auxiliary battery will be charged by the high power battery via the DC/DC converter. Accordingly, even if the auxiliary load is high, the auxiliary battery voltage will not fall below the operating voltage of the controllers, and vehicle startup will be ensured. In addition, since there will be latitude in the charge capacity of the auxiliary battery at the time of vehicle startup, the auxiliary battery will not be damaged.

Then, by starting the operation of the DC/DC converter when the heavy current relay is connected before the pre-startup preparation is completed, it becomes unnecessary to take into consideration the capacity consumed by an auxiliary load and the like in the pre-startup preparation region, when designing the capacity of the auxiliary battery. Accordingly, it is possible to reduce the capacity of the auxiliary battery, in other words, to reduce the size of the auxiliary battery. As a result, it is possible to reduce the size of the auxiliary battery while ensuring vehicle startup and the durability of the auxiliary battery.

BRIEF DESCRIPTION OF THE DRAWINGS

Referring now to the attached drawings which form a part of this original disclosure.

DETAILED DESCRIPTION OF THE EMBODIMENTS

Figure 1:
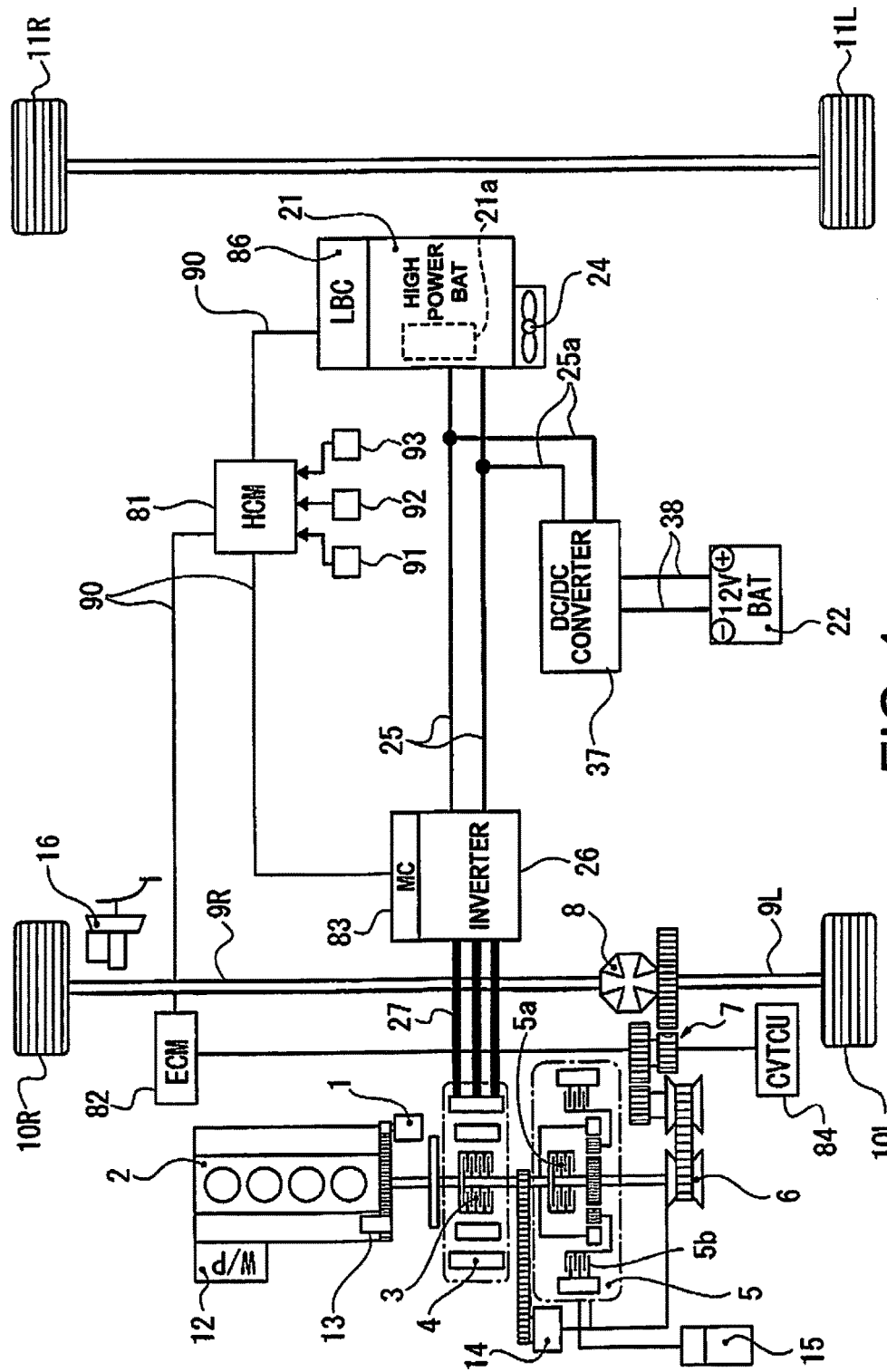
FIG. 1 is an overall system view illustrating an FF hybrid vehicle to which is applied the control device of the first embodiment.

A preferred embodiment for realizing the hybrid vehicle control device of the present invention is described below based on the first embodiment illustrated in the drawings.

First Embodiment

The configuration is described first. The "overall system configuration," and the "detailed configuration of the DC/DC operation timing control" will be separately described regarding the configuration of the FF hybrid vehicle (one example of a hybrid vehicle) to which is applied the control device of the first embodiment.

Overall System Configuration

FIG. 1 illustrates the overall system of an FF hybrid vehicle. The overall system configuration of the FF hybrid vehicle will be described below, based on FIG. 1.

A drive system of an FF hybrid vehicle comprises a starter motor 1, a transverse engine 2, a first clutch 3 (abbreviated "CL1"), a motor/generator 4 (abbreviated "MG"), a second clutch 5 (abbreviated "CL2"), and a belt type continuously variable transmission 6 (abbreviated "CVT"), as illustrated in FIG. 1. An output shaft of the belt type continuously variable transmission 6 is drivingly coupled to left and right front wheels 10R, 10L, via a final reduction gear train 7, a differential gear 8, and left and right drive shafts 9R, 9L. The left and right rear wheels 11R, 11L are configured as driven wheels.

The starter motor 1 is a cranking motor having a gear that meshes with an engine starting gear provided to a crankshaft of the transverse engine 2, and which rotationally drives the crankshaft at the time of engine start.

The transverse engine 2 is an engine disposed in a front room with the crankshaft direction as the vehicle width direction, comprising an electric water pump 12, and a crankshaft rotation sensor 13 that detects a reverse rotation of the transverse engine 2. This transverse engine 2 comprises, as starting methods, a "starter startup mode" that carries out cranking by a starter motor 1 that has a 12V battery 22 as the power source, and an "MG start mode" that carries out cranking by the motor/generator 4 while slip engaging the first clutch 3. The "starter startup mode" is selected when one condition from among a low temperature condition (engine water temperature, high power battery temperature, T/M oil temperature are predetermined values or lower) and a high temperature condition (motor temperature, high power battery temperature are predetermined values or higher) is satisfied. The "MG start mode" is selected at the time of engine start under a condition other than starter startup.

The first clutch 3 is a hydraulically actuated normally open dry multi-plate friction clutch which is interposed between the transverse engine 2 and the motor/generator 4, in which complete engagement/slip engagement/disengagement are controlled by a first clutch hydraulic pressure.

The motor/generator 4 is a three-phase alternating current permanent magnet type synchronous motor which is coupled to the transverse engine 2 via the first clutch 3. This motor/generator 4 uses a high power battery 21 described below as the power source, and an inverter 26, which converts direct current to three-phase alternating current during powering and converts three-phase alternating current to direct current during regeneration, is connected to the stator coil via an AC harness 27.

The second clutch 5 is a hydraulically actuated normally open dry multi-plate friction clutch which is interposed between the motor/generator 4 and the left and right front wheels 10R, 10L, which are drive wheels, in which complete engagement/slip engagement/disengagement are controlled by a second clutch hydraulic pressure. The second clutch 5 of the first embodiment is configured by diverting a forward clutch 5a and a reverse brake 5b provided to a forward/reverse switching mechanism of the belt type continuously variable transmission 6 configured by a planetary gear. That is, the forward clutch 5a is used as the second clutch 5 during forward traveling, and the reverse brake 5b is used as the second clutch 5 during reverse traveling.

The belt type continuously variable transmission 6 is a transmission that achieves a stepless transmission ratio by changing the winding diameter of the belt by applying shifting hydraulic pressure to a primary oil chamber and a secondary oil chamber. This belt type continuously variable transmission 6 comprises a main oil pump 14 (mechanical drive), a sub oil pump 15 (motor drive), and an unillustrated control valve unit that produces the first and second clutch hydraulic pressure and the shifting hydraulic pressure, using the line pressure PL generated by adjusting the pump discharge pressure from the main oil pump 14 as the source pressure. The main oil pump 14 is rotationally driven by a motor shaft of the motor/generator 4 (transmission input shaft). The sub oil pump 15 is mainly used as an auxiliary pump for producing lubrication and cooling oil.

A one-motor-two-clutch drive system is configured by the first clutch 3, the motor/generator 4, and the second clutch 5, and this drive system comprises an "EV mode," an "HEV mode," and an "HEV WSC mode" as the main traveling modes (drive modes) thereof. The "EV mode" is an electric vehicle mode in which the first clutch 3 is released and the second clutch 5 is engaged, and in which the motor/generator 4 is the only drive source; traveling by this "EV mode" is referred to as "EV traveling". The "HEV" mode is a hybrid vehicle mode in which both clutches 3, 5 are engaged, and in which the transverse engine 2 and the motor/generator 4 are the drive sources; traveling by this "HEV mode" is referred to as "HEV traveling." The "HEV WSC mode" is a CL2 slip engagement mode in which the motor/generator 4 is subjected to motor rotation speed control, and the second clutch 5 is slip engaged at a capacity corresponding to the required driving force in the "HEV mode." This "HEV WSC mode" is selected to absorb the rotational difference between the transverse engine 2 (idling rotation speed or greater) and the left and right front wheels 10L, 10R by CL2 slip engagement, between the stopped to the starting regions in the "HEV mode," by not having a rotational difference absorption joint in the drive system, such as a torque converter.

The regenerative cooperation brake unit 16 in FIG. 1 is a device that controls the total braking torque, accompanying the fact that regenerative operation is carried out in principle during brake operation. This regenerative cooperation brake unit 16 comprises a brake pedal, a negative pressure booster that uses the intake negative pressure of the transverse engine 2, and a master cylinder. Then, at the time of a brake operation, the unit carries out a cooperative control of the regeneration amount/fluid pressure amount, so that the amount obtained by subtracting the regenerative braking force from the requested braking force based on the pedal operation amount is allotted to the hydraulic braking force.

The power supply system of the FF hybrid vehicle comprises a high power battery 21 as the motor/generator power source, and a 12V battery 22 as a 12V system load power source, as illustrated in FIG. 1.

The high power battery 21 is a secondary battery mounted as the power source of the motor/generator 4, and, for example, a lithium ion battery is used therefor, in which a cell module configured from a number of cells is set inside a battery pack case. A junction box which aggregates a relay circuit for carrying out supply/cutoff/distribution of heavy current is built in to this high power battery 21, and further attached thereto are a cooling fan unit 24 having a battery cooling function, and a lithium battery controller 86 which monitors the battery charge capacity (battery SOC) and the battery temperature. The junction box comprises a heavy current relay 21a that connects/disconnects the motor/generator 4 and the high power battery 21.

The high power battery 21 and the motor/generator 4 are connected via a DC harness 25, an inverter 26, and an AC harness 27. A motor controller 83 for performing powering/regeneration control is attached to the inverter 26. That is, the inverter 26 converts the direct current from the DC harness 25 to a three-phase alternating current to the AC harness 27 during powering, when the motor/generator 4 is driven by the discharge of the high power battery 21. In addition, the inverter converts the three-phase alternating current from the AC harness 27 to a direct current to the DC harness 25, during regeneration for charging the high power battery 21 with the power generation by the motor/generator 4.

The 12V battery 22 is a secondary battery mounted as a power source of the starter motor 1 and a 12V system load, which is an auxiliary machine; for example, a lead battery mounted on an engine vehicle or the like is used. The high power battery 21 and the 12V battery 22 are connected via a DC branch harness 25a, a DC/DC converter 37, and a battery harness 38. The DC/DC converter 37 is for converting several hundred volts from the high power battery 21 to 12V, which is configured to manage the charging amount of the 12V battery 22 by controlling this DC/DC converter 37 with the hybrid control module 81.

The control system of an FF hybrid vehicle comprises a hybrid control module 81 (abbreviated: "HCM") as an integrated control means having a function to appropriately manage the energy consumption of the entire vehicle, as illustrated in FIG. 1. An engine control module 82 (abbreviated: "ECM"), a motor controller 83 (abbreviated: "MC"), a CVT control unit 84 (abbreviated "CVTCU"), and a lithium battery controller 86 (abbreviated: "LBC") are provided as control means that are connected to this hybrid control module 81. These control means including the hybrid control module 81 are connected so as to be capable of exchanging bidirectional information by a CAN communication line 90 (CAN is an abbreviation for "Controller Area Network").

The hybrid control module 81 carries out various controls, based on input information from each of the control means, an ignition switch 91, an accelerator position opening amount sensor 92, a vehicle speed sensor 93, and the like. The engine control module 82 carries out fuel injection control, ignition control, fuel cut control, and the like of the transverse engine 2. The motor controller 83 carries out powering control, regenerative control, and the like of the motor/generator 4 by the inverter 26. The CVT control unit 84 carries out the engagement hydraulic pressure control of the first clutch 3, the engagement hydraulic pressure control of the second clutch 5, the shifting hydraulic pressure control of the belt type continuously variable transmission 6, and the like. The lithium battery controller 86 manages the battery SOC, the battery temperature, and the like of the high power battery 21.

Detailed Configuration of the DC/DC Operation Timing Control

Figure 2:
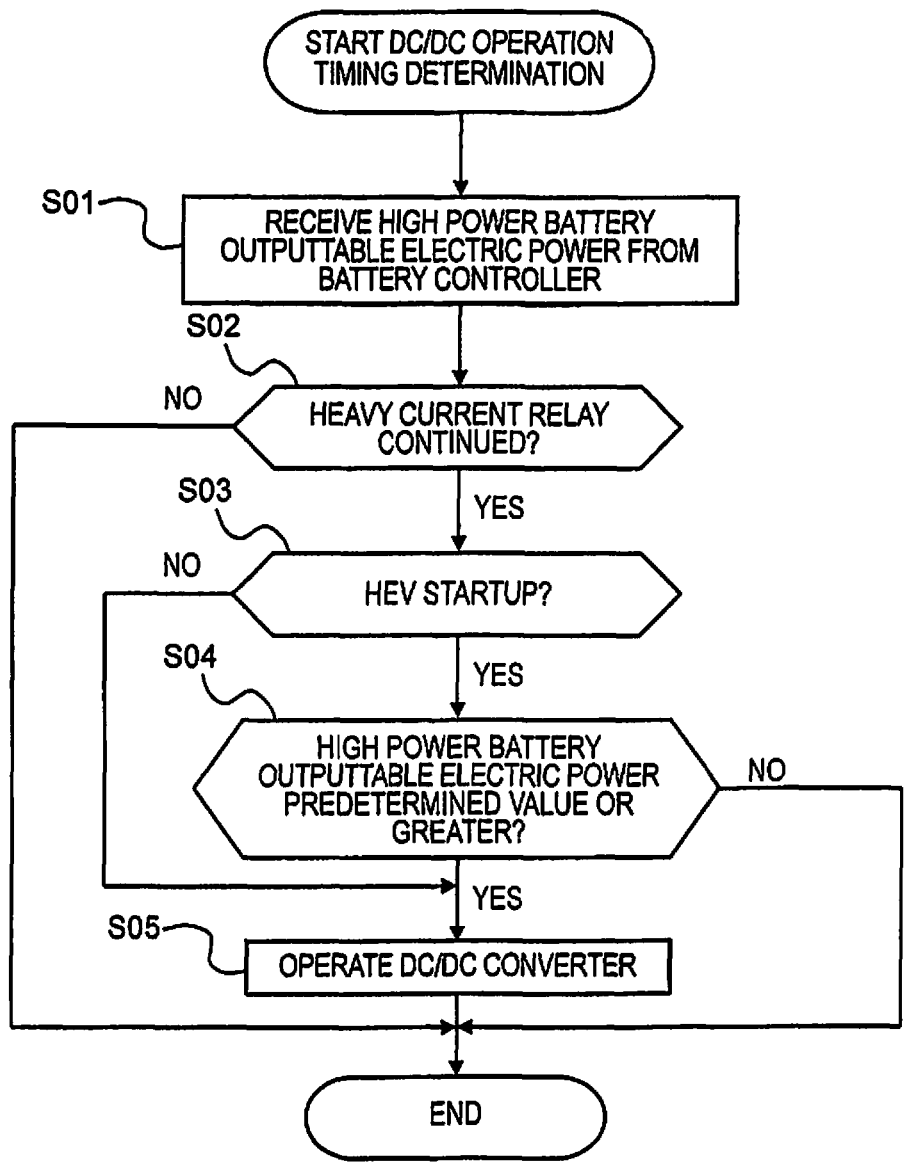
FIG. 2 is a flowchart illustrating the flow of the DC/DC operation timing control steps executed by the hybrid control module of the first embodiment.

FIG. 2 illustrates the flow of the DC/DC operation timing control steps (DC/DC operation timing control means) executed by the hybrid control module 81. Each step in FIG. 2 showing the configuration of the DC/DC operation timing control steps will be described below. This flowchart is started when the ignition switch 91 is turned ON, repeatedly executed at a predetermined control period (for example 10 msec), and ended with a DC/DC converter operation determination. The operation of the DC/DC converter 37 is always started after Ready ON.

In Step S01, information on the outputtable electric power by the high power battery is received from the lithium battery controller 86, and the steps proceed to Step S02. Here, the outputtable electric power by the high power battery is calculated by the lithium battery controller 86, based on the SOC and the temperature of the high power battery 21.

In Step S02, following the reception of the outputtable electric power by the high power battery in Step S01, it is determined whether or not the heavy current relay 21a has been connected. If YES (heavy current relay connected), the steps proceed to Step S03, and if NO (heavy current relay cut off).

In Step S03, following the determination that the heavy current relay is connected in Step S02, it is determined whether or not the startup is an HEV startup. If YES (HEV startup), the steps proceed to Step S04, and if NO (EV startup), the steps proceed to Step S05. Here, the determination of an HEV startup is carried out by including the determination on which engine start mode is selected at the time, from among the "starter startup mode" and the "MG start mode."

Figure 3A:
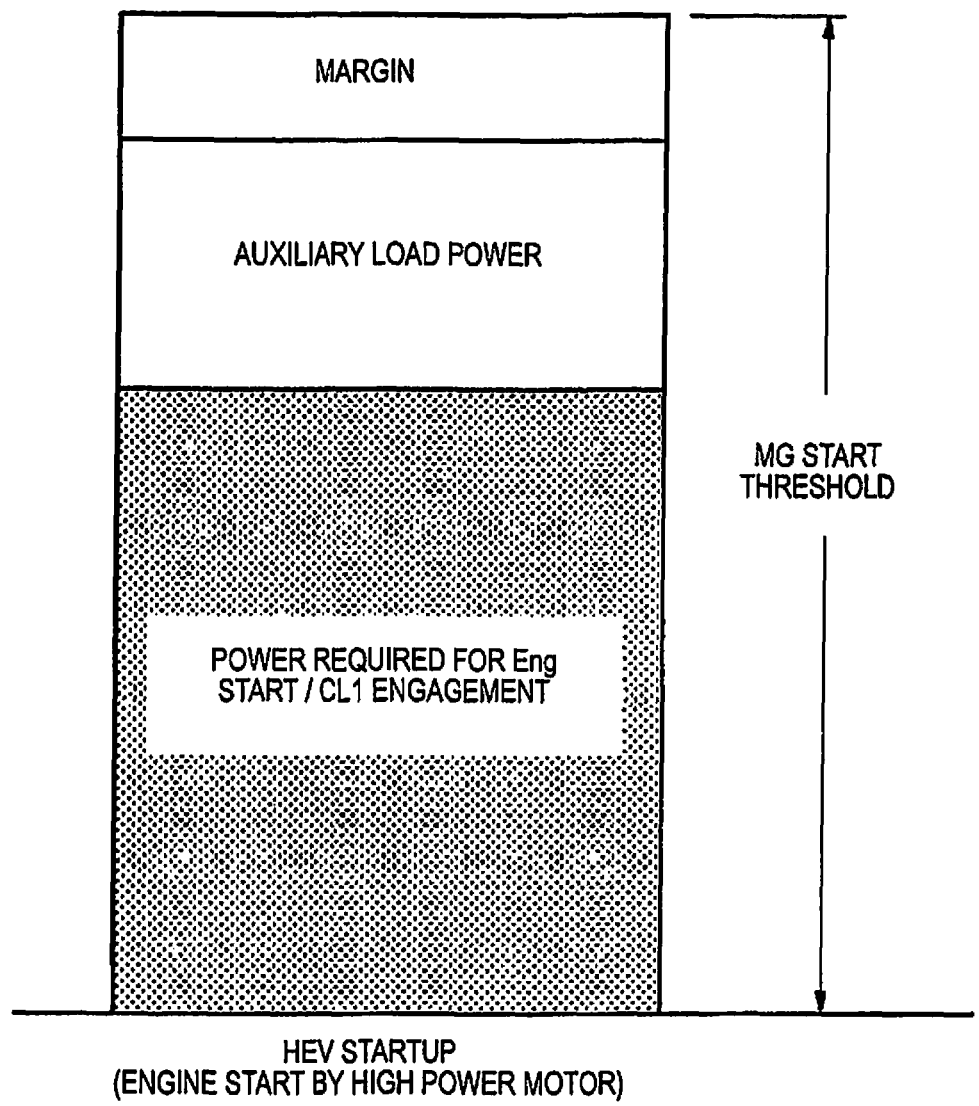
FIG. 3A is a view illustrating the MG start threshold that determines the DC/DC converter operation at the time of HEV startup, of the DC/DC operation timing control steps of the first embodiment.
Figure 3B:
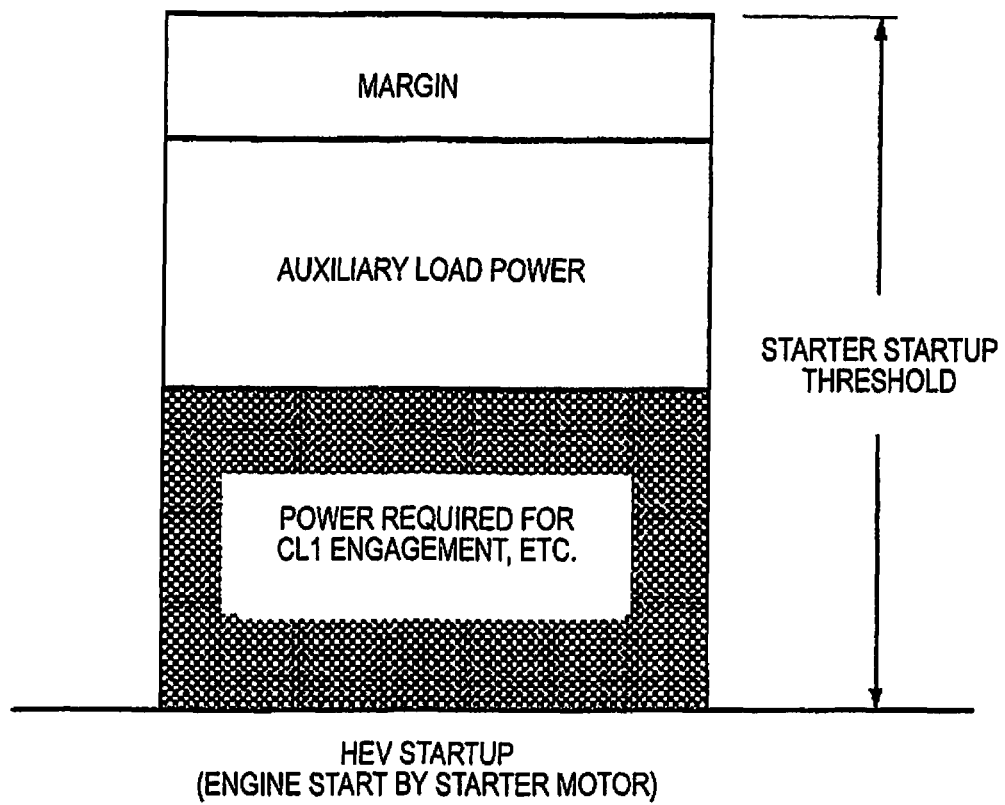
FIG. 3B is a view illustrating the starter startup threshold that determines the DC/DC converter operation at the time of HEV startup, of the DC/DC operation timing control steps of the first embodiment.

In Step S04, following the HEV startup determination in Step S03, it is determined whether or not the current an outputtable electric power by the high power battery which is received in Step S01 is a predetermined value or greater. If YES (an outputtable electric power by the high power battery≥predetermined value), the steps proceed to Step S05, and if NO (an outputtable electric power by the high power battery<predetermined value), the steps proceed to END. Here, the determination of the outputtable electric power by the high power battery is varied depending on whether the engine start method during HEV startup is the "starter startup mode" or the "MG start mode." When the "starter startup mode" is selected, YES is determined in Step S04 if the outputtable electric power by the high power battery is equal to or greater than a starter startup threshold obtained by adding the necessary power for engaging the first clutch 3 or the like, the auxiliary load power, and the margin component, as illustrated in FIG. 3B. When the "MG startup mode" is selected, YES is determined in Step S04 if the outputtable electric power by the high power battery is equal to or greater than an MG start threshold obtained by adding the necessary power for starting the transverse engine 2 and engaging the first clutch 3 or the like, the auxiliary load power, and the margin component, as illustrated in FIG. 3A.

In Step S05, following the EV startup determination in Step S03, or, the determination that an outputtable electric power by the high power battery≥predetermined value in Step S04, the operation of the DC/DC converter 37 is started based on a DC/DC converter operation determination, and the steps proceed to END.

Next, the actions are described. The DC/DC operation timing control action, the DC/DC converter operation determination action during HEV startup by starter startup, the DC/DC converter operation determination action during HEV startup by starter startup by MG start, and the DC/DC converter operation determination action by EV startup will be separately described regarding the actions of the FF hybrid vehicle control device of the first embodiment.

DC/DC Operation Timing Control Action

The DC/DC operation timing control action which starts the operation of the DC/DC converter 37 will be described based on the flowchart illustrated in FIG. 2.

First, after turning the ignition switch 91 ON, a flow that progresses from Step S01→Step S02→END in the flowchart of FIG. 2 is repeated while the heavy current relay 21a is cut off. In Step S02, information on the outputtable electric power by the high power battery is received from the lithium battery controller 86.

Then, if the heavy current relay 21*a* is connected when it is determined that the startup is an EV startup, the steps proceed from Step S01→Step S02→Step S03→Step S05→END in the flowchart of FIG. 2. That is, during an EV startup, if the heavy current relay 21*a* is connected, a DC/DC converter operation is immediately determined, and the operation of the DC/DC converter 37 is started.

On the other hand, if the heavy current relay 21*a* is connected when it is determined that the startup is an HEV startup, the steps proceed from Step S01→Step S02→Step S03→Step S04 in the flowchart of FIG. 2, and in Step S04, it is determined whether or not the currently received an outputtable electric power by the high power battery is a predetermined value or greater. The flow that proceeds from Step S04 to END is repeated while it is determined that an outputtable electric power by the high power battery<predetermined value. Then, when it is determined that an outputtable electric power by the high power battery≥predetermined value, the steps proceed from Step S04 to Step S05→END, and in Step S05, the operation of the DC/DC converter 37 is started based on a DC/DC converter operation determination.

That is, during an HEV startup by a starter startup, the operation of the DC/DC converter 37 is started if the outputtable electric power by the high power battery is equal to or greater than a starter startup threshold (FIG. 3B) obtained by adding the necessary power for engaging the first clutch 3 or the like, the auxiliary load power, and the margin component. On the other hand, during an HEV startup by an MG start, the operation of the DC/DC converter 37 is started if the outputtable electric power by the high power battery is equal to or greater than an MG start threshold (FIG. 3A) obtained by adding the necessary power for starting the transverse engine 2 and engaging the first clutch 3 or the like, the auxiliary load power, and the margin component.

As described above, in the first embodiment, a configuration is employed in which, when the ignition switch 91 is pressed, after connecting a high power relay 21*a* that is interposed between the motor/generator 4 and the high power battery 21, an operation of the DC/DC converter 37 is started when the outputtable electric power by the high power battery is a predetermined value or greater. That is, if the outputtable electric power by the high power battery is a predetermined value or greater after connecting the heavy current relay 21*a*, the 12V battery 22 will be charged by the high power battery 21 via the DC/DC converter 37. Accordingly, even if the auxiliary load is high, the 12V battery voltage will not fall below the operating voltage of the controllers, and vehicle startup will be ensured. In addition, since there will be latitude in the charge capacity of the 12V battery at the time of vehicle startup, the 12V battery 22 will not be damaged. Then, by starting the operation of the DC/DC converter 37 when the heavy current relay 21*a* is connected before the pre-startup preparation is completed, it becomes unnecessary to take into consideration the capacity consumed by an auxiliary load and the like in the pre-startup preparation region, when designing the capacity of the 12V battery 22. Accordingly, it is possible to reduce the capacity of the 12V battery 22, in other words, to reduce the size of the 12V battery 22. As a result, it is possible to reduce the size of the 12V battery 22 while ensuring vehicle startup and the durability of the 12V battery 22. By being able to reduce the size of the 12V battery 22, it becomes possible to mount the 12V battery 22 in a front power unit room, in which are mounted the starter motor 1, the transverse engine 2, the belt type continuously variable transmission 6, and the like. Accordingly, compared to when mounting an auxiliary battery in a rear room or the like which is away from the starter motor, wiring becomes compact, which leads to cost reduction as well.

Figure 4:
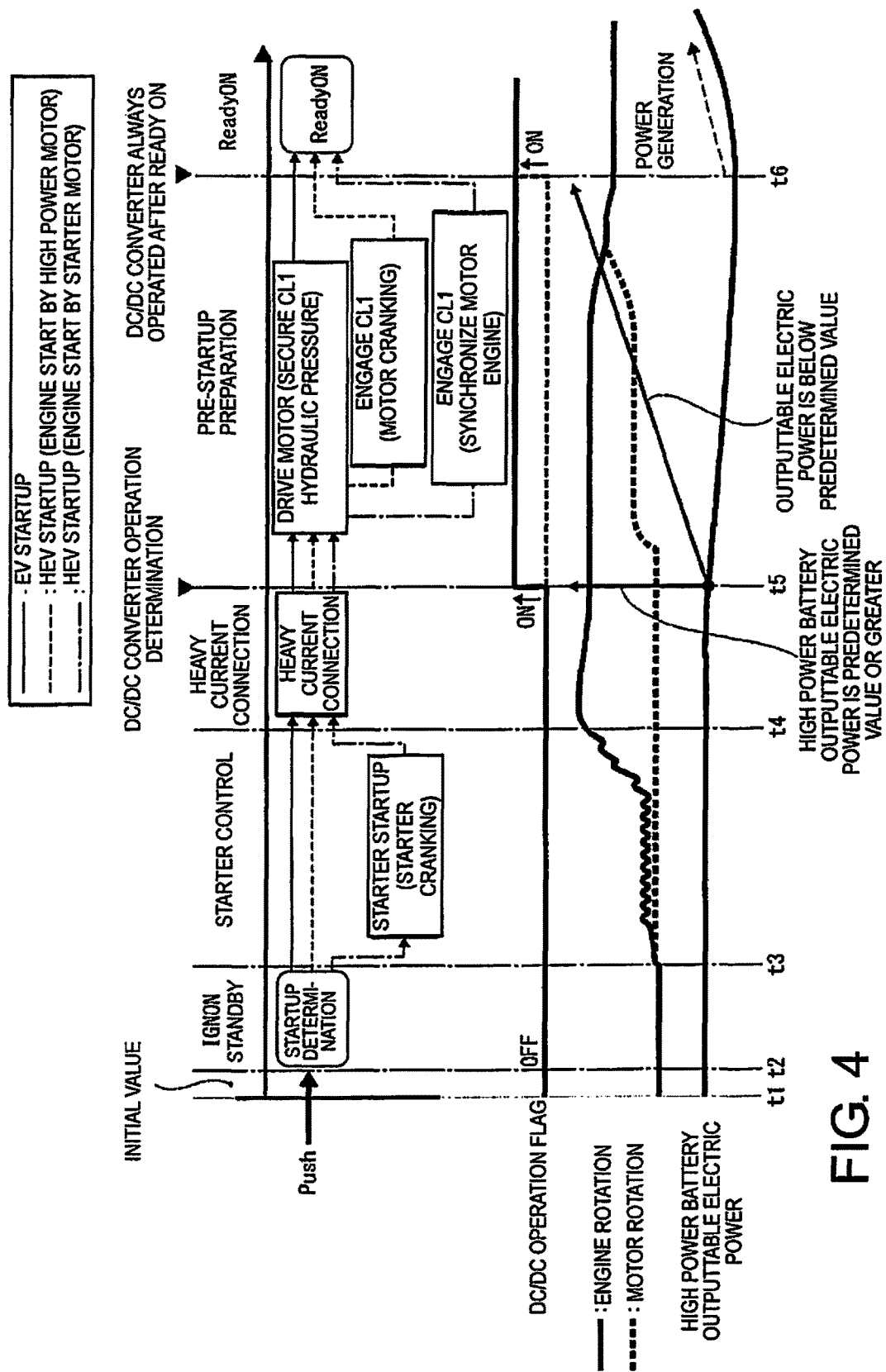
FIG. 4 is a time chart illustrating each characteristic of EV startup/HEV startup (engine start by the power motor)/HEV startup (engine start by the starter motor)/DC/DC operation flag/engine rotation/motor rotation/an outputtable electric power by the high power battery, in the DC/DC operation timing control steps of the first embodiment.

DC/DC Converter Operation Determination Action During HEV Startup by Starter Startup The DC/DC converter operation determination action during HEV startup by starter startup will be described based on the time chart illustrated in FIG. 4.

When the ignition switch 91 is pressed at time t1, a startup determination on whether the startup is an EV startup or an HEV startup is carried out, during the IGN ON waiting period between time t2-time t3. In a starter control period between time t3-time t4, a starter startup is carried out in which the transverse engine 2 is cranked and started by the starter motor 1. In this starter startup, the engine rotation speed is increased while fluctuating, and the engine start is completed at time t4, as illustrated by the engine rotation characteristic between time t3-time t4. In the heavy current connection period between time t4-time t5, the heavy current relay 21*a* is connected after the engine start is completed, the motor/generator 4 and the high power battery 21 are connected via the DC harness 25.

At time t5 at which the connection of the heavy current relay 21*a* has been confirmed, it is determined whether or not the outputtable electric power by the high power battery is a starter startup threshold or greater. Then, if it is determined that an outputtable electric power by the high power battery≥starter startup threshold, the DC/DC operation flag is switched from OFF to ON at time t5, and an operation of the DC/DC converter 37 is started. On the other hand, if it is determined that an outputtable electric power by the high power battery<starter startup threshold at time t5, the DC/DC operation flag is switched from OFF to ON at time t6 when it becomes Ready ON, and an operation of the DC/DC converter 37 is started. Since the starter startup threshold becomes a low value that does not include the power required for an engine start, in most cases excluding exceptional circumstances, an outputtable electric power by the high power battery≥starter startup threshold is determined at time t5.

In a pre-startup preparation period between time t5-time t6, the hydraulic pressure of the first clutch 3 is ensured by an operation of a mechanical oil pump 14 by a driving of the motor/generator 4, and a transition control to an HEV mode for engaging the first clutch 3 is carried out. In this pre-startup preparation, the motor rotation speed is increased after time t5, and the engine rotation and the motor rotation are synchronously rotated from immediately before time t6 at which the engagement of the first clutch 3 is completed, as illustrated in the engine rotation/motor rotation characteristic between time t5-time t6. At time t6, the state becomes Ready ON, which represents completion of the pre-startup preparation.

As described above, in the first embodiment, a configuration is employed in which, if the "starter startup mode" is selected as the engine start method, an operation of the DC/DC converter 37 is started if the outputtable electric power by the high power battery is a starter startup threshold or greater after connecting the heavy current relay 21*a*. That is, in a starter control period (t3-t4) before connecting the heavy current relay 21*a*, the starter motor 1 is driven using the 12V battery 22, and a starter startup is carried out. Consequently, the charge capacity of the 12V battery 22 is reduced due to motor consumption at the point in time in which the heavy current relay 21a is connected. In contrast, a configuration is employed in which an operation of the DC/DC converter 37 is started if the condition that an outputtable electric power by the high power battery≥starter startup threshold is satisfied after connecting the heavy current relay 21a, without waiting for Ready ON, which represents the completion of the pre-startup preparation. Therefore, at the time of an HEV startup by a starter startup, the capacity that is consumed by the starter startup can be compensated with a better response at an early stage, by starting the charging of the 12V battery 22 by the high power battery 21 via the DC/DC converter 37 from the connection timing of the heavy current relay 21a. As a result, even if the auxiliary load is increased immediately after Ready ON, it is possible to respond thereto by the charge capacity of the 12V battery 22.

DC/DC Converter Operation Determination Action During HEV Startup by Starter Startup by MG Start The DC/DC converter operation determination action during HEV startup by starter startup by MG start will be described based on the time chart illustrated in FIG. 4.

When the ignition switch 91 is pressed at time t1, a startup determination on whether the startup is an EV startup or an HEV startup is carried out, during the IGN ON waiting period between time t2-time t3. In the case of an MG start, nothing is carried out during the starter control period between time t3-time t4. In the heavy current connection period between time t4-time t5, the heavy current relay 21a is connected, and the motor/generator 4 and the high power battery 21 are connected via the DC harness 25.

At time t5 at which the connection of the heavy current relay 21a has been confirmed, it is determined whether or not the outputtable electric power by the high power battery is an MG start threshold or greater. Then, if it is determined that an outputtable electric power by the high power battery≥MG start threshold, the DC/DC operation flag is switched from OFF to ON at time t5, and an operation of the DC/DC converter 37 is started. On the other hand, if it is determined that an outputtable electric power by the high power battery<MG start threshold, the DC/DC operation flag is switched from OFF to ON at time t6 when it becomes Ready ON, and an operation of the DC/DC converter 37 is started.

In a pre-startup preparation period between time t5-time t6, the hydraulic pressure of the first clutch 3 is ensured by an operation of a mechanical oil pump 14 by a driving of the motor/generator 4. Thereafter, a transition control to an HEV mode is carried out by an MG start in which the transverse engine 2 is cranked and started by the motor/generator 4, by slip engaging the first clutch 3. In this pre-startup preparation, the motor rotation speed is increased after time t5, and the engine rotation and the motor rotation are matched when the MG start is completed and the first clutch 3 is engaged, as illustrated in the engine rotation/motor rotation characteristic between time t5-time t6. At time t6, the state becomes Ready ON, which represents completion of the pre-startup preparation. If an operation of the DC/DC converter 37 is started at time t6 at which the state becomes Ready ON, as the outputtable electric power by the high power battery is low, the mode is transitioned to an engine generation traveling mode, in which traveling is carried out while generating power by the transverse engine 2, from time t6.

As described above, in the first embodiment, a configuration is employed in which, if the "MG start mode" is selected as the engine start method, an operation of the DC/DC converter 37 is started if the outputtable electric power by the high power battery is an MG start threshold or greater after connecting the heavy current relay 21a. That is, if the "MG start mode" is selected, in a pre-startup preparation period (t5-t6) before connecting the heavy current relay 21a, the motor/generator 4 is driven using the high power battery 21, and an MG start is carried out. Consequently, it is necessary to take into consideration the charge capacity that is consumed from the high power battery 21 by the MG start at the point in time in which the heavy current relay 21a is connected. In contrast, a configuration is employed in which an operation of the DC/DC converter 37 is started if the condition that an outputtable electric power by the high power battery≥MG start threshold is satisfied at the point in time in which the heavy current relay 21a is connected. On the other hand, a configuration is employed in which an operation of the DC/DC converter 37 is postponed until Ready ON, if an outputtable electric power by the high power battery<MG start threshold, at the point in time in which the heavy current relay 21a is connected. Therefore, at the time of an HEV startup by an MG start, it is possible to prepare the charging framework to the 12V battery 22 at an early stage without waiting for Ready ON, if there is latitude in the outputtable electric power by the high power battery including MG start. Then, MG start can be prioritized by postponing the operation of the DC/DC converter 37 until Ready ON, if there is no latitude in the outputtable electric power by the high power battery including MG start.

DC/DC Converter Operation Determination Action by EV Startup

The DC/DC converter operation determination action by EV startup will be described based on the time chart illustrated in FIG. 4.

When the ignition switch 91 is pressed at time t1, a startup determination on whether the startup is an EV startup or an HEV startup is carried out, during the IGN ON waiting period between time t2-time t3. In the case of an EV startup, nothing is carried out during the starter control period between time t3-time t4. In the heavy current connection period between time t4-time t5, the heavy current relay 21a is connected, and the motor/generator 4 and the high power battery 21 are connected via the DC harness 25.

At time t5 at which the connection of the heavy current relay 21a has been confirmed, the DC/DC operation flag is switched from OFF to ON at time t5, and an operation of the DC/DC converter 37 is started, without determining the outputtable electric power by the high power battery. In a pre-startup preparation period between time t5-time t6, the hydraulic pressure of the first clutch 3 is ensured by an operation of a mechanical oil pump 14 by a driving of the motor/generator 4, and at time t6, the state becomes Ready ON, which represents completion of the pre-startup preparation.

As described above, in the first embodiment, a configuration is employed in which, if an EV startup is determined in which the motor/generator 4 is the only drive source, an operation of the DC/DC converter 37 is started immediately after the heavy current relay 21a is connected. That is, a configuration is employed in which, in the case of an EV startup, if the heavy current relay 21a is connected, an operation of the DC/DC converter 37 is started without waiting for Ready ON, which represents the completion of the pre-startup preparation. Therefore, during an EV startup, the charge capacity of the 12V battery 22 can be secured even if the auxiliary load is increased immediately after connecting the heavy current relay 21a, by allowing the charging of the 12V battery 22 by the high power battery 21 via the DC/DC converter 37, at the connection timing of the heavy current relay 21a.

Next, the effects are described. The effects listed below can be obtained with the FF hybrid vehicle control device according to the first embodiment.

(1) In an FF hybrid vehicle comprising, in the drive system, a starter motor 1, an engine (transverse engine 2), a clutch (first clutch 3), and a power motor (motor/generator 4), comprising a high power battery 21 which is a power source of the power motor (motor/generator 4), an auxiliary battery (12V battery 22) which is a power source of the starter motor 1, and a DC/DC converter 37 that is disposed in an intermediate position connecting the high power battery 21 and the auxiliary battery (12V battery 22), and the auxiliary battery (12V battery 22) is charged by the high power battery 21 via the DC/DC converter 37, comprising a DC/DC operation timing control means (hybrid control module 81) that controls the operation start timing of the DC/DC converter 37 at vehicle startup, wherein when a startup switch (ignition switch 91) is pressed, the DC/DC operation timing control means (hybrid control module 81, FIG. 2) connects a heavy current relay 21a interposed between the power motor (motor/generator 4) and the high power battery 21, and thereafter starts the operation of the DC/DC converter 37, if the outputtable electric power by the high power battery is a predetermined value or greater. Accordingly, it is possible to reduce the size of the auxiliary battery (12V battery 22) while ensuring vehicle startup and the durability of the auxiliary battery (12V battery 22).

(2) An engine start control means (hybrid control module 81) is provided, comprising a starter startup mode in which, when an HEV startup is determined where the engine (transverse engine 2) and the power motor (motor/generator 4) are drive sources after the startup switch (ignition switch 91) is pressed, the engine (transverse engine 2) is started by the starter motor 1, wherein when the starter startup mode is selected as the engine start method, the DC/DC operation timing control means (hybrid control module 81, FIG. 2) connects a heavy current relay 21a interposed between the power motor (motor/generator 4) and the high power battery 21, and thereafter starts the operation of the DC/DC converter 37, if the outputtable electric power by the high power battery is equal to or greater than a starter startup threshold obtained by adding the necessary power for engaging the clutch (first clutch 3) or the like, an auxiliary load power, and a margin component. Accordingly, in addition to the effect of (1), at the time of an HEV startup by a starter startup, the capacity that is consumed by the starter startup can be compensated with a better response at an early stage, by starting the charging of the auxiliary battery (12V battery 22) by the high power battery 21 via the DC/DC converter 37 from the connection timing of the heavy current relay 21a.

(3) The engine start control means (hybrid control module 81, FIG. 2) comprises a motor start mode (MG start mode) in which, when an HEV startup is determined where the engine (transverse engine 2) and the power motor (motor/generator 4) are drive sources and the heavy current relay 21a is connected, the engine (transverse engine 2) is started being cranked by the power motor (motor/generator 4) via the clutch (first clutch 3), wherein when the motor startup mode is selected as the engine start method, the DC/DC operation timing control means (hybrid control module 81, FIG. 2) connects a heavy current relay 21a interposed between the power motor (motor/generator 4) and the high power battery 21, and thereafter starts the operation of the DC/DC converter 37, if the outputtable electric power by the high power battery is equal to or greater than a motor start threshold (MG start threshold) obtained by adding the necessary power for starting the engine (transverse engine 2) and engaging the clutch (first clutch 3) or the like, an auxiliary load power, and a margin component. Accordingly, in addition to the effect of (2), at the time of an HEV startup by an MG start, it is possible to prepare the charging framework to the auxiliary battery (12V battery 22) at an early stage, if there is latitude in the outputtable electric power by the high power battery including MG start, and MG start can be prioritized by postponing the operation of the DC/DC converter 37 until Ready ON, if there is no latitude in the outputtable electric power by the high power battery including MG start.

(4) When an EV startup is determined, in which the power motor (motor/generator 4) is the only power source after the startup switch (ignition switch 91) is pressed, the DC/DC operation timing control means (hybrid control module 81, FIG. 2) connects a heavy current relay 21a interposed between the power motor (motor/generator 4) and the high power battery 21, and immediately thereafter starts the operation of the DC/DC converter 37. Accordingly, in addition to the effects of (1)-(3), during an EV startup, the charge capacity of the auxiliary battery (12V battery 22) can be secured even if the auxiliary load is increased immediately after connecting the heavy current relay 21a, by allowing the charging of the auxiliary battery (12V battery 22) by the high power battery 21 via the DC/DC converter 37, at the connection timing of the heavy current relay 21a.

The hybrid vehicle control device of the present invention was described above based on the first embodiment, but specific configurations thereof are not limited to this embodiment, and various modifications and additions to the design can be made without departing from the scope of the invention according to each claim in the Claims.

In the first embodiment, an example was shown in which a "starter startup mode" and an "MG start mode" are provided as engine start control means. However, only the "starter startup mode" may be provided, or only the "MG start mode" may be provided, as an engine start control means.

In the first embodiment, an example was shown in which the control device of the present invention is applied to an FF hybrid vehicle. However, the control device of the present invention is not limited to an FF hybrid vehicle, and may be applied to an FR hybrid vehicle or a 4WD hybrid vehicle as well. In short, the present invention may be applied to any hybrid vehicle comprising a starter motor, an engine, a power motor, and an auxiliary battery that is charged by a high power battery via a DC/DC converter.

The invention claimed is:

1. A hybrid vehicle control device of a hybrid vehicle for controlling a drive system including a starter motor, an engine, a clutch and a power motor, the hybrid vehicle control device comprising:
 a high power battery which is a power source of the power motor;

an auxiliary battery which is a power source of the starter motor;

a DC/DC converter that is disposed in an intermediate position connecting the high power battery and the auxiliary battery so that the auxiliary battery is charged by the high power battery via the DC/DC converter; and a hybrid control module programmed to perform an engine start control that starts the engine by the starter motor after a startup switch is pressed, a Ready ON determination which determines Ready ON at a point in time in which a pre-startup preparation for securing hydraulic pressure of a drive system is completed after engine start, and control an operation start timing of the DC/DC converter at vehicle startup, wherein when a startup switch is pressed, the hybrid control module is programmed to connect a heavy current relay interposed between the power motor and the high power battery, and starts the DC/DC converter, if an outputtable electric power by the high power battery is a predetermined value or greater, and if the outputtable electric power by the high power battery is not a predetermined value or greater, the operation of the DC/DC converter is started after the Ready ON determination.

2. The hybrid vehicle control device according to claim 1, wherein the hybrid control module is programmed to start the DC/DC converter, upon determining by the high power battery is equal to or greater than a starter motor startup threshold obtained by adding necessary power for engaging the clutch, an auxiliary load power, and a margin component.

* * * * *